Figure 1:
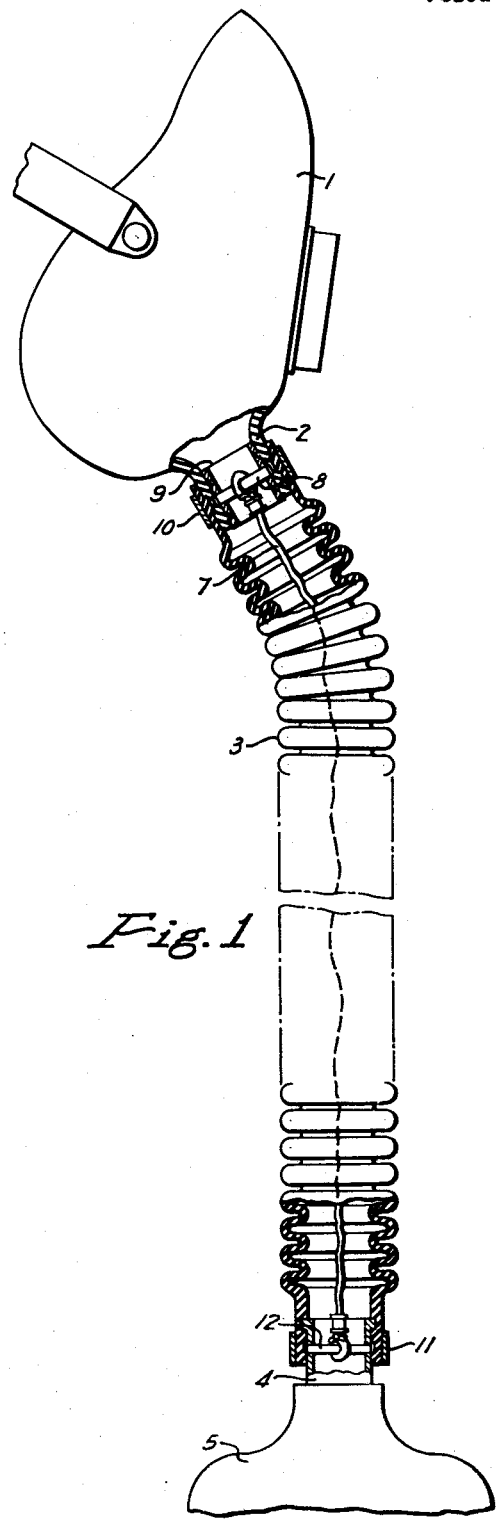

Sept. 12, 1961   W. C. HAMILTON ET AL   2,999,497
BREATHING APPARATUS HOSE RESTRAINER
Filed July 11, 1957

INVENTORS
WILLIAM C. HAMILTON AND
HARRY W. AUSTIN
BY
Brown, Critchlow, Flick & Peckham
THEIR ATTORNEYS nited States Patent Office 2,999,497
Patented Sept. 12, 1961

2,999,497
BREATHING APPARATUS HOSE RESTRAINER
William C. Hamilton and Harry W. Austin, Pittsburgh, Pa., assignors to Mine Safety Appliances Company, Pittsburgh, Pa., a corporation of Pennsylvania
Filed July 11, 1957, Ser. No. 671,236
5 Claims. (Cl. 128—142)

This invention relates to the flexible hoses of breathing apparatus, and more particularly to means for limiting their stretching.

With the advent of jet aircraft and the resulting requirement for emergency bailouts at exceedingly high wind velocities, there has been established a need for an oxygen mask breathing tube or hose that will not stretch very far during bailout. Such a hose must be flexible or elastic enough to permit the pilot to move his head up and down and from side to side when the mask is on his face. The standard annularly corrugated rubber breathing tube now in use easily meets this requirement and is entirely satisfactory under normal service conditions. However, trouble is encountered when bailout is required at speeds exceeding 300 miles per hour. Average bailout velocities are now well in excess of 500 miles per hour. Under the blast of the high velocity air stream encountered when the pilot is ejected from his plane, the hose may be stretched as much as 500 percent of its free length. This can result in several hazardous situations. Thus, the hose flailing around in the air stream may tear the oxygen mask from the wearer's face. At high altitudes this can result in the pilot's death from oxygen deficiency before he falls to an altitude where there is sufficient oxygen to sustain life. Or, the flailing hose may tear loose from the oxygen bottle fastened to the pilot, which not only cuts off the oxygen supply but may also cause serious injury or death as the hose blackjacks him with the relatively heavy metal connector at the free end of the whipping hose. Another hazard is that the flailing hose itself can cause serious injury to the pilot or possible disastrous damage to other equipment he may be wearing.

It is among the objects of this invention to provide in breathing apparatus an elastic hose that is prevented from stretching excessively beyond normal dimensions, and that is provided with a shock absorber to prevent undesirable snapping action as the stretching hose is restrained. Another object is to provide a hose stretch controller and shock absorbing device that can readily be applied to existing breathing apparatus.

In accordance with this invention, an axially elastic breathing apparatus hose has its opposite ends secured to a face mask and an oxygen supply connector that can connect the hose with an oxygen bottle. Extending through the hose is a flexible cord, the opposite ends of which are anchored at the mask and connector. The cord between its anchored ends is only enough longer than the length of the hose between the mask and connector to permit unrestrained normal stretching of the hose. The cord is made from undrawn permanently stretchable material, so that when excessive tension is applied to the hose, due to the air blast encountered during aircraft bailout at high speed, the cord will be elongated permanently a limited amount as the hose stretches a corresponding abnormal amount. Therefore, the elongating cord will absorb energy and thereby serve as a shock absorber.

Figure 2:
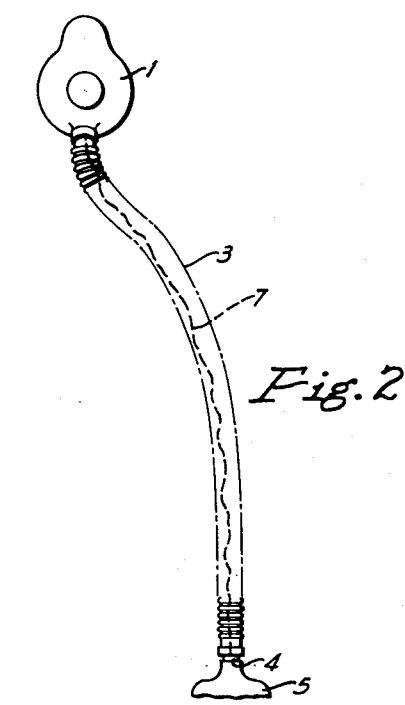
Figure 3:
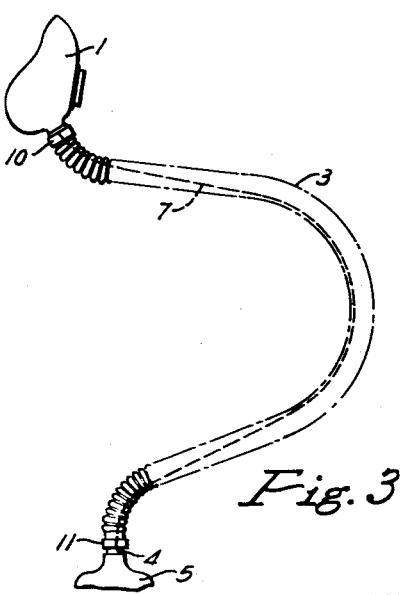

The preferred embodiment of the invention is illustrated in the accompanying drawing, in which
FIG. 1 is a side view of breathing apparatus;
FIG. 2 is a reduced front view thereof; and
FIG. 3 is a reduced side view showing the hose stretched abnormally but restrained by the shock absorbing cord extending through it.

Referring to FIGS. 1 and 2 of the drawing, a conventional oxygen breathing mask 1 may be a half mask as shown or a full mask. The lower part of the mask is provided with a downwardly inclined inlet passage defined by a cylindrical flange 2. Encircling this flange is the upper end of a conventional corrugated rubber breathing hose 3, the lower end of which is secured to a connector 4 that can be detachably connected to an aircraft oxygen system or to an oxygen bottle 5 strapped to the body of the pilot. If it becomes necessary for the pilot to bail out, he first makes sure that the connector is inserted in the neck of the oxygen bottle so that he will have oxygen in his descent by parachute through the rare atmosphere. The flexibility of the hose will permit its normal stretching without restraint as the pilot moves his head about.

It is a feature of this invention that if the pilot bails out of his aircraft at high speed, the blast against him of the high velocity air stream when he is ejected from the plane will not cause the elastic hose to stretch so much that it will flail around and cause death, injury or damage as pointed out above. Accordingly, a flexible restraining cord 7 of predetermined length extends through the hose and is anchored at its opposite ends. The upper end of the cord is anchored at the mask by looping it around a cross pin 8 that extends diametrically across a metal sleeve 9, in which the ends of the pin are secured by upsetting or staking. The sleeve fits in the tubular flange 2 of the facepiece and is provided with circumferential grooves, into which the surrounding material of the mask is squeezed by a suitable metal band 10 clamped tightly around the end of the hose. The lower end of the hose encircles the flanged upper end of the connector 4 in the usual way and is held thereon by a metal band 11 clamped tightly around it. Extending across the connector is a pin 12, the ends of which are secured in the side wall of the connector. The lower end of the cord is looped around this pin and secured like the upper end. Consequently, if tension is put on the cord the pull is taken by the facepiece and oxygen bottle, not by the hose. While the hose is under no tension, there is enough slack in the cord to permit normal unrestrained stretching of the hose that must occur if it is not to restrict the usual movements of the pilot in piloting the plane. However, the cord is not long enough to permit the hose to stretch appreciably more than what is necessary for such normal movements of the pilot.

If the pilot has to bail out, the pressure of the air blast against the hose can stretch it until it pulls the cord 7 taut, whereupon the hose will be restrained. To avoid the severe and possibly dangerous snap or jerk that otherwise might occur when the cord is pulled taut, another feature of this invention is that the restraining cord likewise can stretch to a limited extent when the pressure of the hose against it exceeds a predetermined value. However, the cord is not elastic, but is made from permanently-stretchable material so that it will absorb the energy required to stretch it and not release that energy. Thus, the cord is made from undrawn synthetic plastic material, either in the form of fibers or a solid extruded cord, capable of being elongated without recovery and the elastic limit of which is exceeded practically as soon as it starts to stretch. Another quality of this material is that the tensile strength per unit of cross sectional area increases after the elastic limit is reached, instead of decreasing like conventional materials. Certain polyamides and polymers of vinyl compounds, such as polyvinylidene chloride, are suitable for this purpose. A characteristic of such polymers is that they include long-chain molecules and are of crystalline structure with at least some of their crystals randomly disposed. When the cord is stretched, it necks down as its molecules are drawn out into parallel relation with one another. While elongating, it will absorb a considerable amount of energy, and since it will not recoil or recover when the stretching force is removed, it serves as a true shock absorber. Of course, during this stretching of the cord, the hose stretches further a corresponding amount, but such additional abnormal stretching is very small compared with what would occur if the control cord were not used.

An advantage of this invention is that the employment of a standard mask and hose and the connections that join them together and to an oxygen bottle makes it readily adaptable to simple field modification of the thousands of breathing apparatus currently in service.

According to the provisions of the patent statutes, we have explained the principle of our invention and illustrated and described what we now consider to represent its best embodiment. However, we desire to have it understood that, within the scope of the appended claims, the invention may be practiced otherwise than as specifically illustrated and described.

We claim:

1. In breathing apparatus, the combination with an axially elastic hose having its opposite ends secured to a mask and oxygen supply connector, of a stretch controller comprising a slack flexible cord extending through the hose, and means anchoring the ends of the cord at the mask and connector, said cord between said means being only enough longer than the length of the hose between the mask and connector to permit unrestrained normal stretching of the hose, and the cord being made from undrawn permanently-stretchable material, whereby when excessive tension is applied to the hose said cord will be elongated permanently a limited amount as the hose stretches a corresponding abnormal amount, the elongating cord absorbing energy and thereby serving as a shock absorber.

2. In breathing apparatus as recited in claim 1, said cord being made from a long-chain crystalline polymer having at least some of its crystals randomly disposed.

3. In combination with a face mask and oxygen tank as used by jet pilots, a flexible rubber bellows type tubing attached at one end to an inlet pipe of the face mask and at the other end to an outlet pipe of the oxygen tank, said tubing having a nylon filament therein of small diameter relative to the diameter of the tubing, said inlet pipe and said outlet pipe each having a pin positioned across the inside thereof, said filament having a length approximately equal to the distance between the two pins when the bellows tubing is at normal length in a straight line, one end of the tubing being clamped to the exterior of the inlet pipe, one end of said filament being looped around the pin inside the inlet pipe and secured thereto, the other end of the tubing being clamped to the exterior of the outlet pipe, and the corresponding end of said filament being looped around the pin inside the outlet pipe and secured thereto, whereby the filament and tubing are separately attached directly to the face mask and oxygen tank and extreme flexibility of the bellows tubing is maintained but elongation to the breaking point is prevented by the filament.

4. In combination with a face mask and oxygen tank as used by jet pilots, a flexible rubber bellows type tubing attached at one end to an inlet pipe of the face mask and at the other end to an outlet pipe of the oxygen tank, said tubing having a nylon filament therein of small diameter relative to the diameter of the tubing, said inlet pipe and said outlet pipe each having a pin positioned across the inside thereof, one end of the tubing being clamped to the exterior of the inlet pipe, one end of said filament being looped around the pin inside the inlet pipe and secured thereto, the other end of the tubing being clamped to the exterior of the outlet pipe, and the corresponding end of said filament being looped around the pin inside the outlet pipe and secured thereto, whereby the filament and tubing are separately attached directly to the face mask and oxygen tank and extreme flexibility of the bellows tubing is maintained, said filament being short enough to hold the bellows tubing from elongating abnormally.

5. In combination with a face mask, an oxygen tank as used by jet pilots, a flexible bellows type tube attached at one end to the inlet pipe of the face mask and at the other end to the outlet pipe of the oxygen tank, said tube having therein a flexible cord filament of small diameter relative to the diameter of the tube, loops formed in each end of such filament, means connected with the face mask and oxygen tank respectively, passing through said loops for positively securing one end of the filament to the face mask and the other end of the filament to the oxygen tank independently of the tubing, said filament having a length such that when the bellows tubing is at normal length in a straight line the filament will not be under tension but short enough to prevent abnormal stretching of the bellows tubing, one end of said tubing being clamped to the exterior of the inlet pipe and the other end of the tubing being clamped to the exterior of the outlet pipe, whereby the filament and tubing are separately attached to the face mask and oxygen tank and extreme flexibility of the bellows tubing is maintained but elongation to the breaking point is prevented by the filament.

References Cited in the file of this patent

UNITED STATES PATENTS

| | | |
|---|---|---|
| 957,492 | Brown | May 10, 1910 |
| 2,100,835 | Ciamberlini | Nov. 30, 1937 |
| 2,444,029 | Bowen | June 29, 1948 |
| 2,474,124 | Schultz | June 21, 1949 |
| 2,811,674 | Smith | Oct. 29, 1957 |